US009754344B2

United States Patent
Brothers et al.

(10) Patent No.: US 9,754,344 B2
(45) Date of Patent: Sep. 5, 2017

(54) FORWARD LATE PREDICTIVE RENDERING IN A GRAPHICS SYSTEM

(71) Applicant: Samsung Electronics Co., Ltd., Suwon-si, Gyeonggi-do (KR)

(72) Inventors: John W. Brothers, Calistoga, CA (US); Santosh Abraham, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 14/645,210

(22) Filed: Mar. 11, 2015

(65) Prior Publication Data

US 2015/0379671 A1 Dec. 31, 2015

Related U.S. Application Data

(60) Provisional application No. 62/018,395, filed on Jun. 27, 2014.

(51) Int. Cl.
| | |
|---|---|
| *G06T 11/00* | (2006.01) |
| *H04N 19/00* | (2014.01) |
| *H04N 19/176* | (2014.01) |
| *G06F 9/45* | (2006.01) |
| *G06F 9/38* | (2006.01) |
| *G06T 1/60* | (2006.01) |
| *G09G 5/36* | (2006.01) |
| *G09G 5/393* | (2006.01) |
| *G06T 11/40* | (2006.01) |

(52) U.S. Cl.
CPC ............... *G06T 1/60* (2013.01); *G06F 8/433* (2013.01); *G06F 9/3838* (2013.01); *G06T 11/40* (2013.01); *G09G 5/363* (2013.01); *G09G 5/393* (2013.01); *G09G 2350/00* (2013.01); *G09G 2360/121* (2013.01)

(58) Field of Classification Search
CPC ......... G06T 11/001; G06T 11/60; H04N 7/12; H04N 19/00; H04N 19/176; H04N 11/02; H04N 11/04; G06F 15/16; G06F 9/3885; G06F 8/433; G06F 9/3838
USPC .......................... 345/581, 619; 712/216–219
See application file for complete search history.

(56) References Cited

U.S. PATENT DOCUMENTS

| | | | |
|---|---|---|---|
| 8,692,829 B2 | 4/2014 | Hakura et al. | |
| 8,711,167 B2 | 4/2014 | Wyatt | |
| 8,760,460 B1 | 6/2014 | Kilgariff et al. | |
| 9,172,923 B1 * | 10/2015 | Prins ................... | H04N 19/436 |
| 2009/0187756 A1 | 7/2009 | Nollet et al. | |
| 2011/0074802 A1 | 3/2011 | Nickolls et al. | |
| 2011/0080404 A1 | 4/2011 | Rhoades et al. | |

(Continued)

*Primary Examiner* — Ke Xiao
*Assistant Examiner* — Andrew Shin
(74) *Attorney, Agent, or Firm* — Lewis Roca Rothgerber Christie LLP (57) ABSTRACT

A graphics processing operation may include a set of render target operations, in which render targets are read and one or more intermediate computations are performed before generating final render target output. A method of performing graphics processing includes determining a dependency between render targets and defining a scheduling of tiles to reduce or eliminate a need to write intermediate computations to external memory. An interleaved order may be determined to maintain intermediate computations of dependent render target operations in an on-chip cache hierarchy.

18 Claims, 7 Drawing Sheets

(56) References Cited

U.S. PATENT DOCUMENTS

| | | |
|---|---|---|
| 2011/0080407 A1 | 4/2011 | Duluk, Jr. et al. |
| 2011/0081100 A1 | 4/2011 | Lindholm et al. |
| 2011/0242113 A1* | 10/2011 | Keall .................... G06F 9/3857 |
| | | 345/505 |
| 2011/0285743 A1 | 11/2011 | Kilgard |
| 2012/0280992 A1 | 11/2012 | Shebanow et al. |
| 2013/0198759 A1 | 8/2013 | Shah et al. |
| 2013/0198760 A1 | 8/2013 | Cuadra et al. |
| 2013/0342547 A1 | 12/2013 | Lum et al. |
| 2014/0118370 A1 | 5/2014 | Hakura et al. |
| 2014/0118380 A1 | 5/2014 | Hakura et al. |
| 2014/0164743 A1 | 6/2014 | Giroux et al. |
| 2015/0109293 A1* | 4/2015 | Wang .................... G06T 15/405 |
| | | 345/422 |

\* cited by examiner

FIG. 7

FORWARD LATE PREDICTIVE RENDERING IN A GRAPHICS SYSTEM

CROSS REFERENCE TO RELATED APPLICATIONS

The present application claims the benefit of Provisional Application No. 62/018,395 filed Jun. 27, 2014, the contents of which are hereby incorporated by reference.

FIELD OF THE INVENTION

The present invention is generally related to rendering of tiles of graphical images in render operations. More particularly, the present invention is directed to reducing the need to access off-chip memory to perform intermediate computations for an application including rendering of multiple render targets.

BACKGROUND OF THE INVENTION

Figure 1:
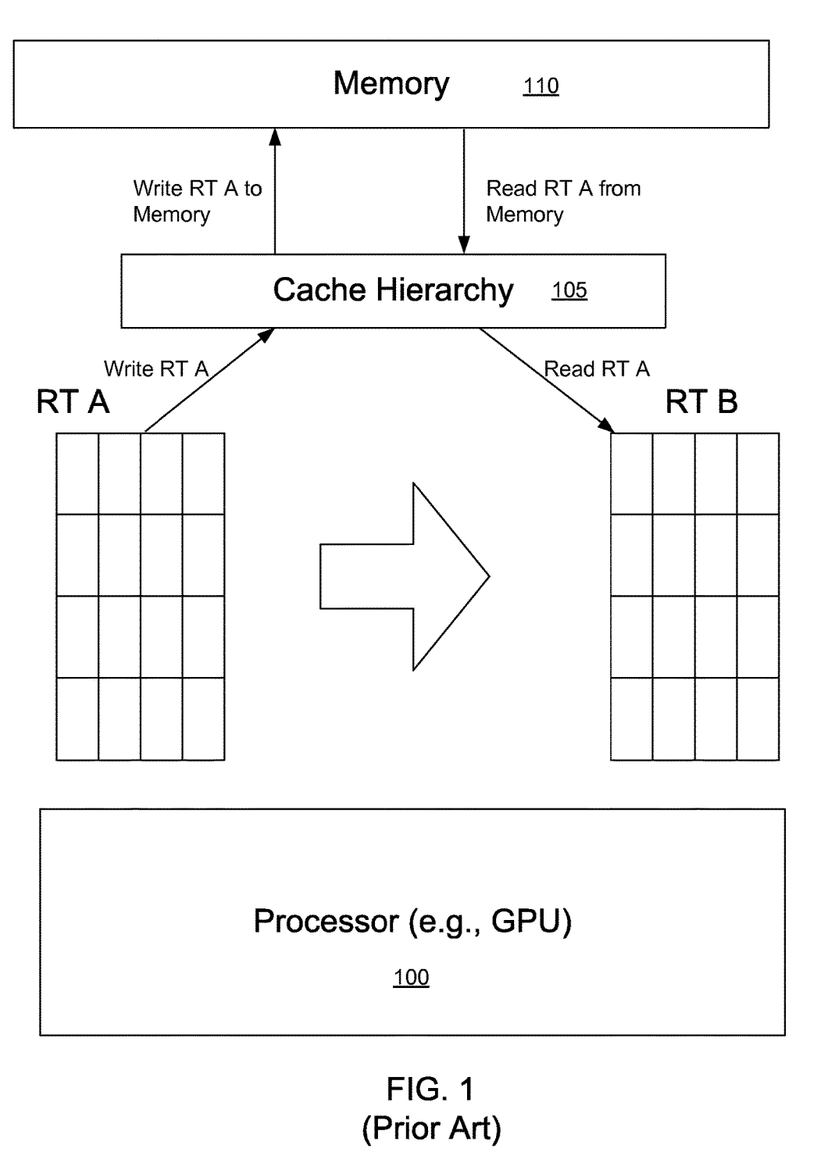
FIG. 1 illustrates a conventional render target process that requires read and write operations with an external memory to perform intermediate computations.

Graphical images are often generated in several steps. For example an image may be created and then read to create another image. Referring to FIG. 1, consider an application operating on a graphics processing unit (GPU) 100 that includes a render target (RT) step. The GPU 100 includes an on-chip cache hierarchy 105, where the cache hierarchy 105 may include different cache levels, such as L1 and L2 cache memory. Additionally the GPU 100 can access an external memory 110. The RT is an intermediate memory surface to which a 3D image is rendered. A Render Target Texture or RTT is an RT that can be read as input texture by a pixel shader in the graphics processor 100.

In the case of rendering textures, a sequence of steps may be performed to create RT "A" and then read RT A to create RT "B". For example one possibility is to create an image and then add motion blur. Another possibility is to create a G-buffer (lighting parameters) and then create the lit image.

However, these render target steps conventionally require access to external memory 110. Consider a graphics application that produces an intermediate image A, and then reads image A to produce image B. Given common image sizes (e.g., 1920×1080 pixels), and assuming the pixel is 4 bytes (RGBA8888 format), the intermediate image would have to be written to external memory because cache sizes on conventional GPUs are not big enough to hold 8 MB of data. Thus image A, even if broken down into smaller tiles (e.g., 64 pixel×64 pixel tiles, where a tile corresponds to rectangular region of a screen), would have to be written to external memory 110 and then read back by the GPU 100 to produce image B.

Thus in the prior art a graphics processor would normally render all of a first RT (e.g., RT A), write it to external memory 110, and then read it from external memory 110 to create a second RT (RT B). This approach has the drawback that it creates a lot of traffic to and from the external memory 110. Additionally, this process can also include rendering of unnecessary portions of intermediate images.

Embodiments of the present invention were developed in view of the deficiencies in the prior art.

SUMMARY OF THE INVENTION

A graphics processing operation may include a set of image rendering operations. A method of performing graphics processing includes determining a dependency between render targets and defining a scheduling of tiles to reduce or eliminate a need to read/write intermediate computations to external memory. An interleaved order may be determined to maintain tiles of intermediate computations of dependent render target operations in an on-chip cache.

In one embodiment of a method a dependence relationship is determined between at least two render targets (RTs) of a graphics processing operation. An interleaving schedule is determined that defines an order of tile processing of the graphics processing operations to maintain intermediate tile processing computations of dependent render targets of the graphics processing operation in an on-chip cache. Tiles are rendered using the interleaving schedule.

In one embodiment of a method includes scheduling an interleaved order of tile processing for a sequence of render target steps having a dependency of render targets. The interleaved order is selected to maintain a set of intermediate tile processing computations of dependent render targets in an on-chip cache of a graphics processing system. Tiles are rendered using the interleaving order of tile processing.

In one embodiment a graphics system includes a graphics processing unit having an on-chip cache. A dependency analysis module determines dependencies in a graphics processing operation including a set of interdependent render target operations. A scheduling module schedules an interleaved order of tile processing of the graphics processing operations, based on the dependency analysis, to maintain intermediate tile processing computations in an on-chip cache of the graphics system.

DETAILED DESCRIPTION

Embodiments of the present invention are directed to scheduling the rendering of tiles of dependent render target operations of a graphics processing operation via forward late predictive rendering. At least one render target image is dependent on another render target image. More generally, a graphics processing operation may include many render targets, such as when a graphics process generates a sequence of intermediate images in the process of generating a final output image. A final resultant image of the graphics processing operation may be flushed to external memory. In one embodiment a dependence of the render targets is used to intelligently schedule tile processing of dependent render target images to minimize or eliminate a need to access external memory writing and reading of the intermediate computations.

Figure 2A:
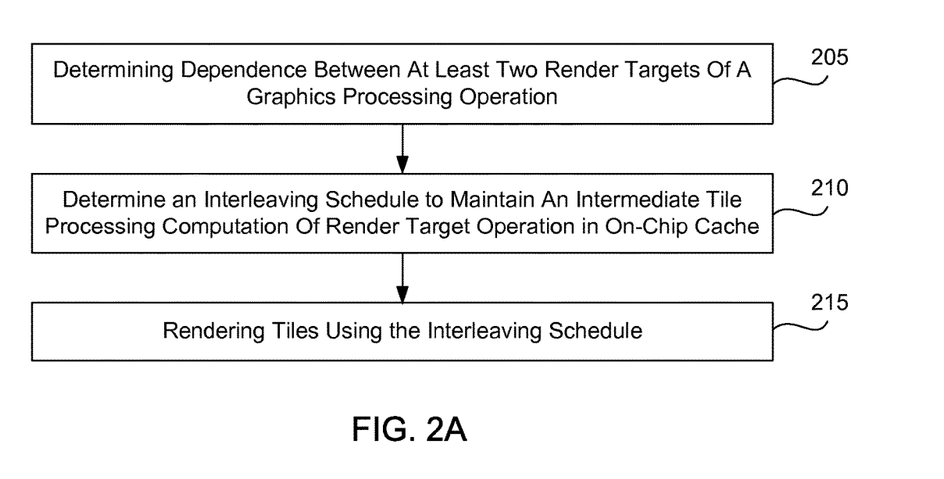
FIGS. 2A and 2B illustrate methods of determining an interleaved schedule of interdependent render target operations in accordance with embodiments of the present invention.
Figure 2B:
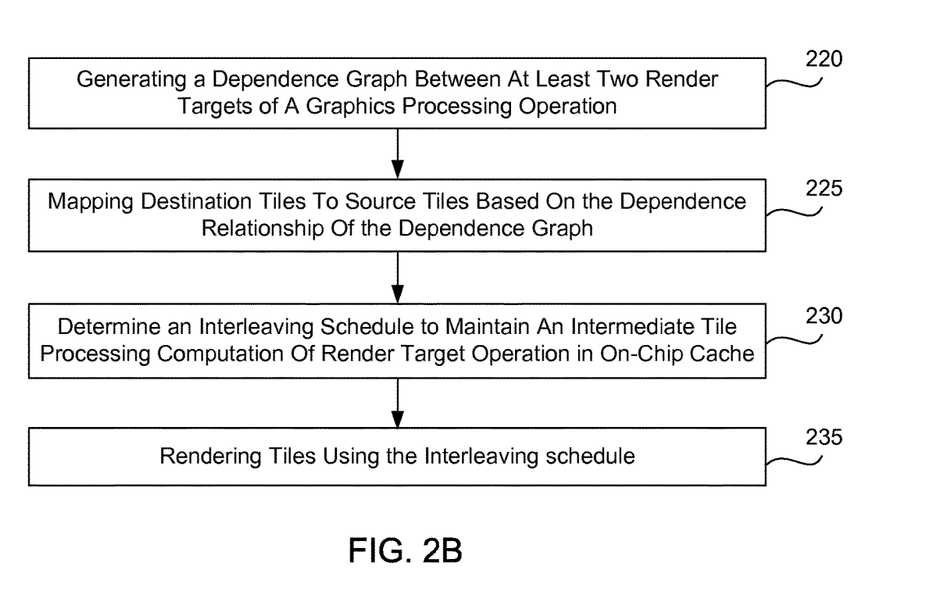

FIGS. 2A and 2B are flow charts illustrating embodiments for scheduling dependent render target operations to reduce a need to access external memory for intermediate computations. Referring to FIG. 2A, in one embodiment of a method, dependence is determined between at least two render targets of a graphics processing operation in block 205. An interleaving schedule, based on the dependence, is determined in block 210 to maintain an intermediate tile processing computation of a render target operation in an on-chip cache. Tiles are rendered according to the interleaving schedule in block 215. FIG. 2B show an embodiment of a method in which a dependence graph is generated between at least two render targets of a graphics processing operation in block 220. A mapping is performed to map destination tiles to source tiles based on the dependence relationship of the dependence graph in block 225. An interleaving schedule is determined to maintain intermediate tile processing results of a render target operation in an on-chip cache in block 230. Tiles are rendered based on the interleaving schedule in block 235.

Figure 3:
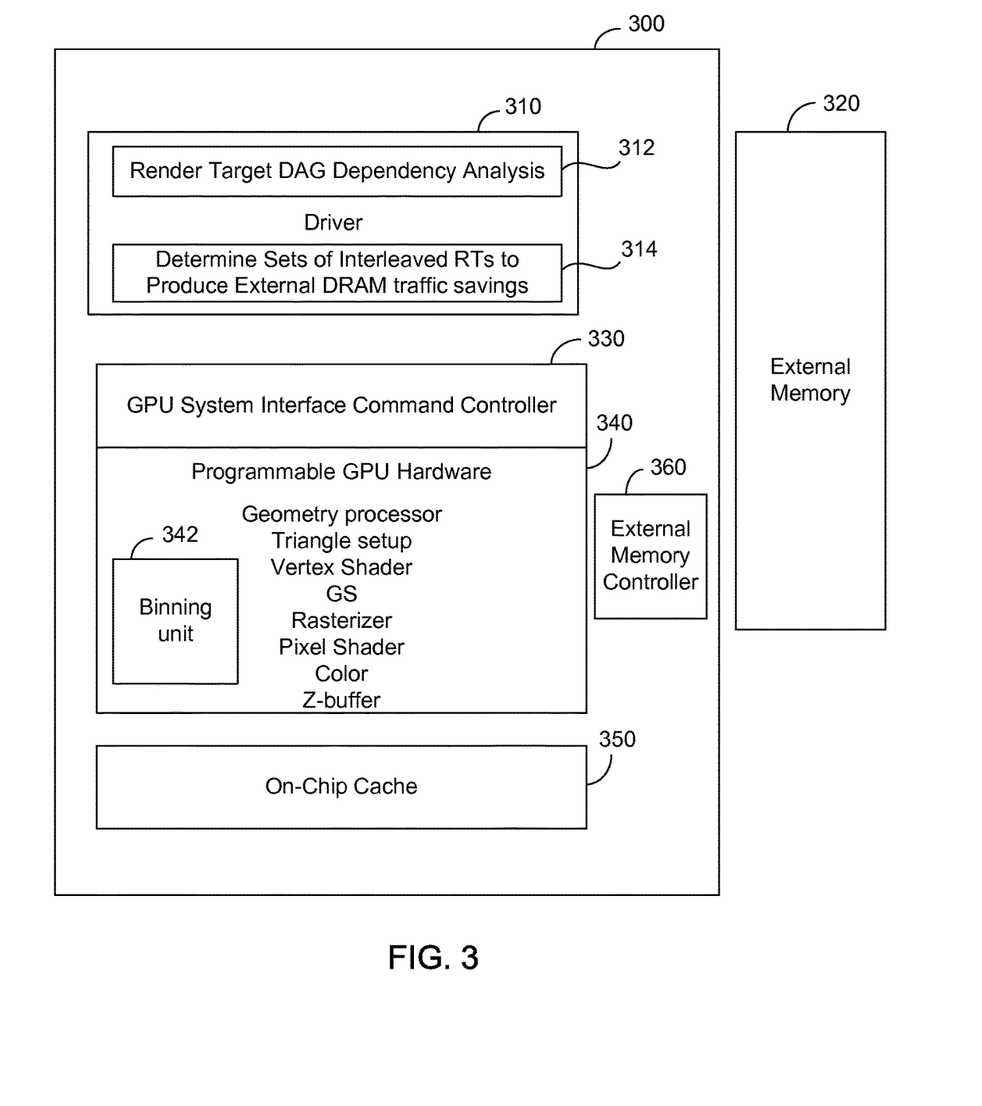
FIG. 3 illustrates a graphics system in accordance with an embodiment of the present invention.

FIG. 3 illustrates a graphics processing system in accordance with an embodiment of the present invention. A graphics processing unit (GPU) 300 includes programmable graphics hardware 340 and may be implemented as a system on a chip. The programmable graphics hardware 340 supports shader operations, including render target operations and associated texture operations. Examples of programmable graphics operations include geometry processing, triangle setup, vertex shading, geometry shading, rasterization, pixel shading and color and Z operations. In one embodiment hardware support is provided to support multiple command streams. Portions of the hardware, such as a binning unit 342, may be used to aid in determining the interleaving schedule.

In one embodiment a driver 310 includes a dependency analysis module 312 to perform a render target dependency analysis and a scheduler module 314 to determine a tile interleaving schedule to reduce traffic to external memory, such as an external memory 320. In one embodiment, when processing related images, two or more RTs are divided into tiles, and the scheduler module 314 in the driver 310 uses an interleaved scheme to process the tiles of two or more render targets, although more generally the interleaving can be extended to the situation of multiple render targets, such as that in graphics operations in which many intermediate images are rendered to generate a final image.

In one embodiment the GPU 300 includes a system interface command processing controller (SICP controller) 330 to act as an interface between the driver 310 and the rest of the GPU hardware 340. An on-chip cache hierarchy 350 includes cache levels, such as a L2 and L3 cache. Access is provided by a memory controller 360 to external memory 320.

In one embodiment the scheduling of the rendering of tiles for a set of dynamic textures is selected such that necessary intermediate computations are written to and read back directly from an on-chip cache. This avoids traffic to and from external memory for intermediate Render Targets (RT)'s of textures (RTTs) through intelligent scheduling. Thus, the rendered texture data for intermediate computations remains on die in the closest cache. In one embodiment the scheduling is selected to achieve tradeoffs between reducing the penalty for accessing off-chip memory and other considerations related to the computational burden of determining an interleaving order. For example, the scheduling may be based on a maximum likelihood of maintaining necessary intermediate computations in the on-chip cache and provisions provided to fall back to conventional processing of intermediate computations via external memory when an ideal schedule cannot be achieved. In one embodiment the tile rendering is scheduled to produce the minimum possible intermediate data. This maximizes the ability to keep intermediate rendering data in cache, avoiding a round-trip to external memory.

Additionally, in some embodiments, the scheduling is selected to eliminate unneeded rendering in parts of an intermediate RT, where those parts aren't used to generate the final image, such as cases where part of the rendered texture is never used (such as clipped or Z-rejected) or the part of the rendered texture is not visible in the final image, such as environment mapped objects in a final image not reflecting part of the environment map.

Figure 4:
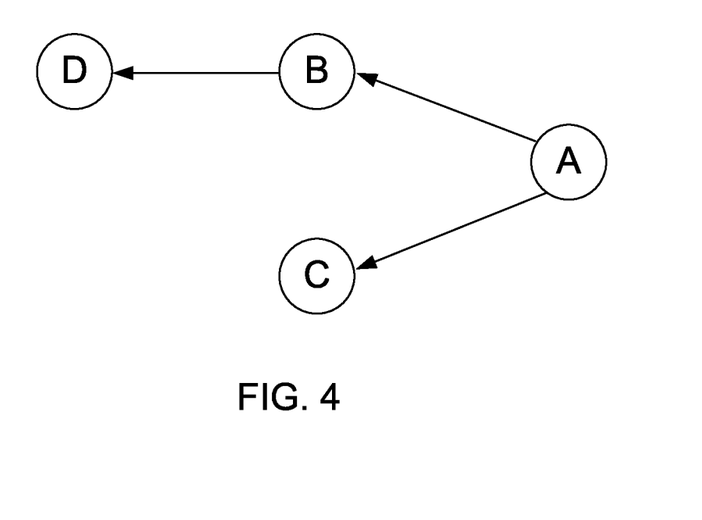
FIG. 4 illustrates a dependency graph in accordance with an embodiment of the present invention.

Referring to FIG. 4, in one embodiment a data flow graph (or equivalent data structure) is generated by dependency analysis module 310 that shows that the immediate dependency between images A and B, and may also include other subsequent images (e.g., C, D). The data flow graph of FIG. 4 corresponds to a directed acyclic graph (DAG) defining dependencies between different render targets. The DAG defines the dependencies. In one embodiment as the driver examines a stream of commands it then determines if the image of RT B ever references RT A. If RT B does reference RT A, then the driver examines the resolution (e.g., width and height of results) and makes a strategic decision on how many levels to follow the dependency graph to reduce external memory accesses. For example, there may be diminishing returns to follow the dependency graph beyond a certain number of levels. An interleaving schedule is then generated to keep intermediate results in on-chip cache.

Figure 5:
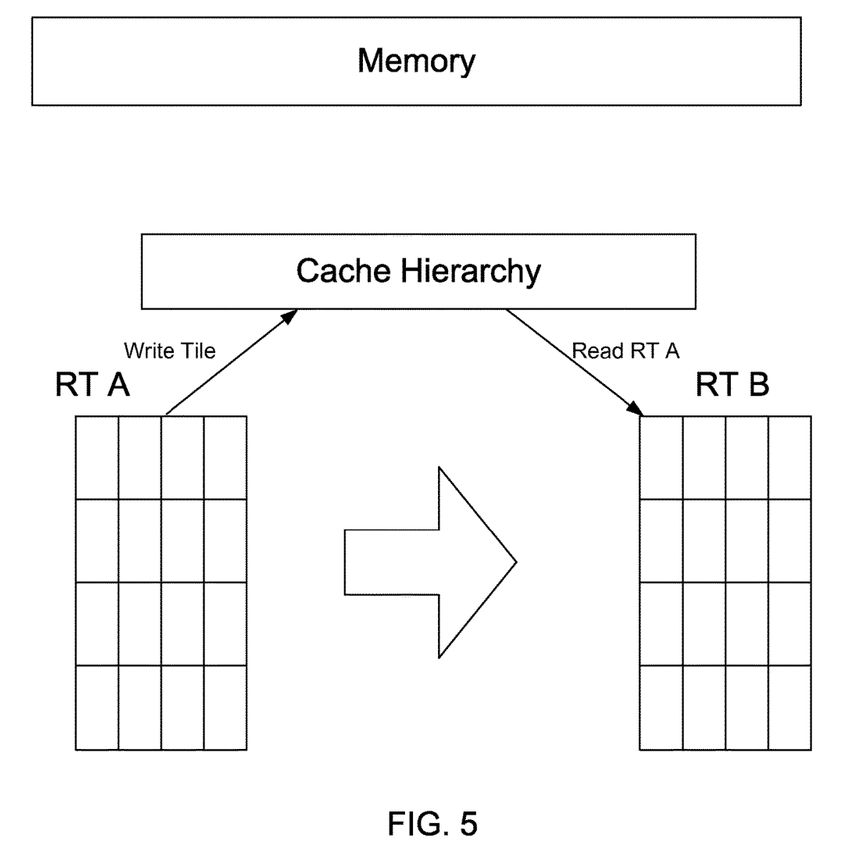
FIG. 5 illustrates a render target process having an interleaving schedule selected to maintain intermediate computations in an on-chip cache hierarchy in accordance with an embodiment of the present invention.

FIG. 5 illustrates an example in which the intermediate computations of a RT operation are maintained in the on-chip cache. In this example RT B is dependent on RT A. The scheduling is chosen to write tiles of RT A to the cache and then read them to RT B. The scheduling of the processing of the tile read and write operations may be selected to generate an interleaved schedule such that after a tile of image A is produced and stored to on-chip cache, that tile is immediately read back to produce a tile of image B thus, saving memory bandwidth. The interleaved schedule may proceed in an order consistent with the dependency analysis that is selected to optimize use of the cache and thus minimize the need to use external memory for the intermediate computations. Additionally, in one embodiment the dependency analysis may be used in the scheduling scheme to eliminate performing processing on tiles that would never contribute to a tile of a final image, thus eliminating unneeded work.

In one embodiment method is extended to an arbitrary number of dependent render target operations. That is, a sequence of RT operations is performed in which various processing operations are performed and a final result is created that is flushed out to external memory with computations of the intermediate RT operations remaining, as much as possible, in the on-chip cache. In one embodiment the processing of the tiles of the multiple RTs in an interleaved manner occurs using the following 4 steps:

Step 1: a dependence graph is generated that is a directed graph representing the ordering of various jobs or objects. In one embodiment the driver generates a dependence graph per set of interdependent RTs defining what RT's depend on which other RT's. Hardware support may be provided for multiple command streams.

Step 2: tile mapping is performed to capture tile dependencies for source and destination RTs. In one embodiment this includes:

(a) mapping the destination tile back to the source tiles to create a dependency mapping. In one embodiment source tiles that will not be used to produce the destination tile will not be mapped and thus those sources tiles that will not be used will not be produced eliminating unneeded work.

(b) generating a logical mask (or its equivalent) per destination with 1 bit per source tile indicating which source tiles are read to generate that destination tile.

(c) Optionally, generating a "use count" per source tile from the mask bits where destination mask bits in the same position are added together to get "use count" used later to explicitly evict related cache lines when the source tile has been read for the last time.

(d) In one embodiment a binning unit mode of the GPU is used for tile mapping. In one embodiment a binning unit mode is used to determine which tiles in a particular RT, such as RT A, are intersected by triangles in another RT, such as RT B.

Step 3: generate a tile interleaving schedule based on a dependency analysis. This may include a static analysis or dynamic analysis to determine what a dependency mapping implies for resource usage and order of tile processing. In one embodiment a static analysis may be software based. In one embodiment a speculative history based analysis may be performed using a speculative technique with a bail-out strategy. In one embodiment a dynamic analysis may be performed by the SICP after time mapping generation Step 4: rendering tiles using the interleaving schedule based on the dependency mapping. In one embodiment an optimal order for the cache footprint is generated, which may include optimizing the cache footprint and traffic between cache levels. For example, the tiles in the destination RT can be rendered in row major order (or some other order) based on achieving minimal cache footprint. Likewise, source tiles required for a given destination RT might be rendered in a different order to maximize cache performance.

Other optimizations may be performed for cache usage, such as selecting tile size to attempt to maintain computations for all data in L2 cache first, then L3 cache. Cache traffic may be balanced against binning and state change overhead. Cache traffic will be less with smaller tiles. However binning and state change will be more with smaller tiles.

The division of an image into tiles and selection of an optimal interleaving schedule for the cache hierarchy results in the minimization of accesses to main memory and the last levels of cache. This results in: (1) lower memory traffic to the external memory and the last levels of cache; (2) improved performance; and (3) decreased power consumption.

In one embodiment a dependency chain of RT's is determined by working backwards, generating the needed textures, consuming them to generate the next, and so on to avoid writing intermediate RT's out to external memory and reading them back. Additionally in some cases this eliminates rendering in cases where some part of a RT isn't used to generate the final image, such as in reflections or shadows for example.

The dependencies in the dependency chain may be determined in various ways. In one embodiment the dependencies are determined from a prior frame and then a determination is made whether it is worthwhile to attempt to define an interleaving schedule. For example, the dependencies may be relatively straightforward or be extremely complicated, depending on the nature of the graphics application being run and what graphics process is being performed on a particular sequence of images. Working backward through the dependency chain of RT's may include working out what tile size to use so intermediate data stays local in the on-chip cache. For example, in one embodiment the process gets the extents of the rendered texture, interpolates the texture coordinates at the RT B tile corners, and gets the dimensions of the RT A tiles that correspond, and optionally shrink the RT B tile dimensions to get RT A tiles to fit. The dependency chain can be worked back for more complex dependencies.

In one embodiment a methodology for ROR (Reverse Order Rendering) includes deferring rendering of RT's marked as textures (TRT's) until processing of a final RT. A final RT would be the last RT reading some number of textures RT, which is defined as RTn, where n is a positive integer. The texture RT's would be TRT(n−1,1), TRT(n−1, 2), TRT(n−2,1) etc where: TRT=texture render target and the first index refers to its level in the dependency hierarchy and the second index indicate which RT it is in that level when there are multiple at the same level. Some graphics language, such as Direct X®, distinctly mark RT's when they can be read as textures, Z, and color. If a graphics language does include such a capability, an extension or other technique may be provided to support detecting that that a RT can be read as a texture. In this example the command buffers resulting from the API calls for the TRT's would be saved until ready to process. The processing would begin when the final RT (top of the hierarchy) is processed. However, in the event that the system runs out of cache buffer memory the system could process at least the oldest TRT's to free up space.

The RT dependency tree is then built up. For example, RTn reads TRT(n−1,1) through TRT(n−1,4), TRT(n−1,1) reads TRT(n−2,1), etc. A criteria is preferably included to trim the dependency to control complexity. For example, a rule may be included to immediately process RT's rendered with more than some threshold of draw calls or primitives.

Figure 6:
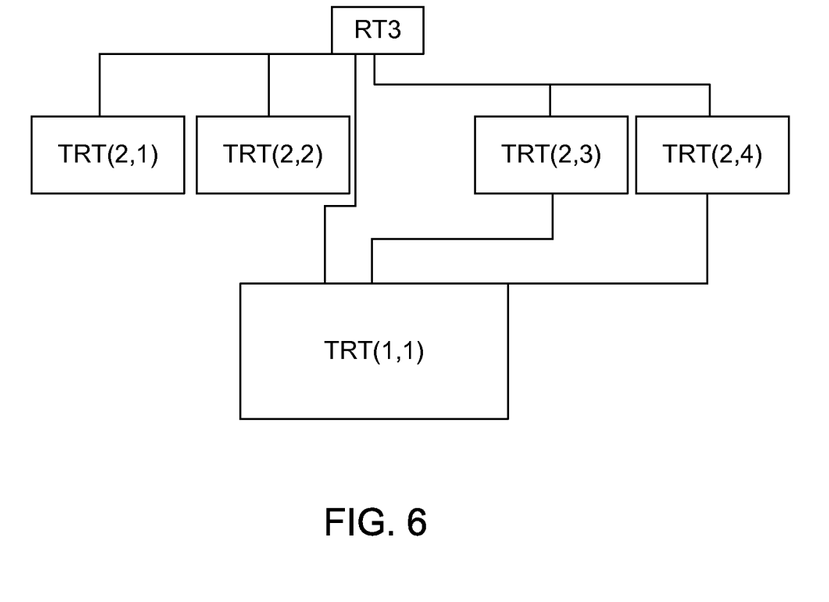
FIG. 6 illustrates aspects of a reverse order rendering process in accordance with an embodiment of the present invention.

In one embodiment RT nodes are processed from a bottom to a top of a hierarchy, as illustrated in FIG. 6. For the purposes of illustration, assume that there are 3 levels in the hierarchy. A determination is made of tile sizes in each of the RT's to keep in on-chip cache the TRT data required to generate 1 tile of RT3. The tile size in the TRT's must be big enough to generate one complete tile in the level above. As an example, the tile size in the level above is reduced so that the corresponding tiles in the levels below can be reduced to fit in cache.

Processing is then performed of the TRTs. This includes processing TRT(1,1) first, then TRT(2,3) & TRT(2,4). The maximum tile size required in TRT(1,1) is chosen for a tile from each of the two RT's that will read it as a texture. The tile size of TRT(2,x) tiles are reduced until the TRT(1,1) tile will fit in cache (might be L2 or L3 cache). The processing then includes performing binning passes for TRT(2,3) and TRT(2,4) and generating one tile worth of TRT(1,1).

More complex tile-level mappings may be supported. In one embodiment multiple tiles in a dependent RT map to one tile of the destination RT.

Figure 7:
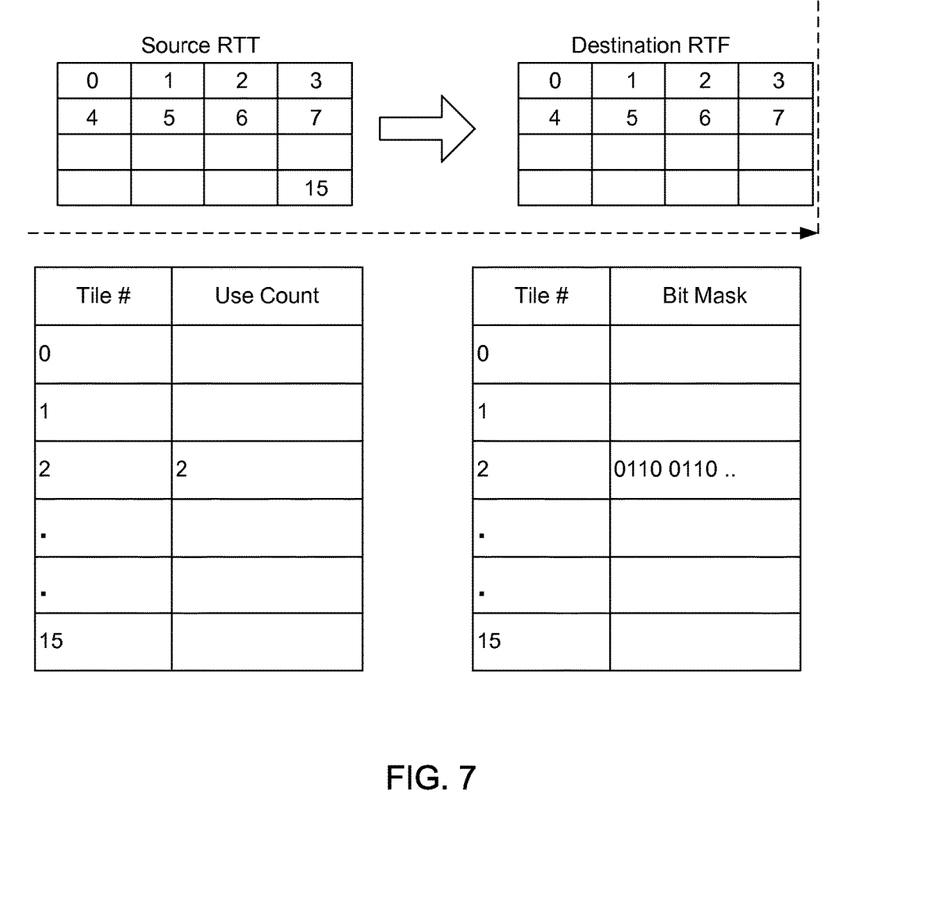
FIG. 7 illustrates source tile use counts and destination tile bit masks in accordance with an embodiment of the present invention.

FIG. 7 illustrates a tile mapping embodiment having use counts and a bit mask. A dependence graph is initially generated. Tile dependencies are then determined for the source and destination tile. Each destination tile is mapped back to source tiles. As an example, suppose a destination RTF tile 0 requires RTT source tiles 0, 1, 4, and 5. A mask is generated per destination tile with 1 bit per source tile indicating which are read to generate that destination tile. In one embodiment a bit position is used to indicate a tile ID. A use counter is generated per source tile from the masks. Destination mask bits in the same position are used to get a use count. In this example each RT has 15 tiles for the purposes of illustration. Each tile in source RTT has a tile number and a use count. The use count is decremented and source tiles are marked for eviction from the cache, when the reference count decreases to 0.

Embodiments of the invention may include different types of image dependency, including 2-level dependency such as 1:1 dependency, 1:n dependency, and n:1 dependency; and N-level deep mapping, including simple and complex mapping.

In one embodiment there is a plurality of separate command queues, one per RT. Software generates separate command streams for each RT. The command streams are preferably randomly accessible to have the ability to traverse tiles in various orders and skip unneeded tiles. In this embodiment the graphics hardware switches between command queues so a producer (RTT) generates just enough data for a consumer (RTF) to execute 1 minimum work unit.

In one embodiment a maximum likelihood algorithm is utilized to determine an interleaving strategy that has a maximum likelihood of fitting into the cache. However, a bad prediction is not fatal. Indeed, for some types of mappings, such as environment mappings, there may be no simple foolproof way to predict what RTT tiles to render to optimize the rendering process. Various options may be provided for handling mispredictions in individual frames and also avoiding or minimizing the effects of mispredictions. That is one option is to have a low cost fallback for mispredicting and another strategy is to have criteria for turning the interleaving scheduling off based on identifying a misprediction criteria.

One option is to degrade gracefully to the performance/power of conventional rendering if it is determined that the dependency mapping and scheduling algorithms are not working properly in a previous frame. That is, the strategy in this option is to identify situations where the algorithms are not performing well and gracefully degrade to conventional rendering.

Another option is a strategy to handle cases that can usually be predicted well, and then punt on the rest. That is, the strategy is to identify cases for which excellent predictions may be made and deliberately choose to utilize conventional scheduling for cases that cannot be predicted well.

In one embodiment a source tile miss is detected. This may include maintaining a mask of generated source tiles that is updated with each new source tile written back to cache. In one embodiment when generating the destination tile, the most significant bits (MSBS) of UV are then used to generate a source tile ID (which for example, might correspond to set of four or more IDs for bilinear operations). A check that these bits are set in the "present mask" may be used to detect a source tile miss. If a source tile miss is detected during rendering of the destination, one option is to abort the destination tile, generate a missing source tile, and restart an aborted destination tile. Another option is to keep rendering till the end of a tile, and get a complete list of missing source tiles, then generate them and restart destination tile rendering.

A context switch capability may be provided to address textures that are not present or for other reasons, including provisions to save or store context to deal with missing tile information on a given pass.

Various mapping options may be supported for mapping the dependency tree. These include mapping per pair of adjacent nodes in the dependency tree. Exact mapping options may be supported, such as computing UV texture coordinates at all visible sample locations and computing a UV range per tile, assuming a rectangle maps to a trapezoidal or rectangle. Approximate mapping options may be supported, such as performing a low resolution UV only shader operation to write out which source tiles are referenced by each destination tile. A mix/max operation of the UV for a quad may be used to define source mapping. Mapping may also be performed using prior frames.

Embodiments of the present invention may be applied to a variety of post-processing operations. Examples include popular post-processing operations such as:
Bloom filter
Depth of field
Motion blur
Cell shading—a.k.a., toon shading
Shadow mapping
G-buffer
Multi-Sample Anti-Aliasing (MSAA) resolve
In shader, for example, with edge detection
Mipmap generation
Image filtering
Separable filters done in multiple passes
Single pass filter
Edge detection+blur
operations incorporating Z (e.g., eliminating "leakage" on depth of field)
operations incorporating multiple render targets (MRTs), such as color and Z render targets It will be understood that embodiments of the present may be practiced in applications besides graphics that have a 2D array pipeline application, such as an image processing pipelines.

Mapping of tiles may also be mixed with rendering rather than doing all of the mapping up front followed by rendering. As an illustrative example, consider a motion blur example. An initial image is rendered, which is the unblurred image. A motion vector image is generated by subtracting from the position of each pixel in the new image its position in the prior frame. A motion-blurred image is then generated using the motion vector image to determine a filter width, which impacts what part of the unblurred image is needed to generate the final image. In one embodiment to perform motion blur, for each destination tile, the process first generates the tile required for the motion blur image. This tile is then used to map back into the unblurred image to determine what tiles are needed. These tiles are then rendered and then the final destination tile.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention in accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. In a graphics processing system, a method comprising:
determining a dependence relationship between at least two render targets (RTs) of a graphics processing operation;
performing a tile mapping of destination tiles to source tiles based on the dependence relationship and utilizing the tile mapping to determine an interleaving schedule;
determining the interleaving schedule defining an order of tile processing of the graphics processing operation to maintain intermediate tile processing results of dependent render targets of the graphics processing operation in an on-chip cache; and
rendering tiles using the interleaving schedule;
wherein performing tile mapping comprises mapping a destination tile back to source tiles.

2. The method of claim 1, wherein determining the dependence relationship includes generating a dependence graph per set of interdependent render targets.

3. The method of claim 2, wherein a dependency analysis module generates the dependence graph per set of the interdependent RTs.

4. The method of claim 1, further comprising generating a mask indicating which source tiles are read to generate a destination tile.

5. The method of claim 4, further comprising generating a use count per source tile and based on the use count determining when a source tile has been read for a final time.

6. The method of claim 1, further comprising determining when a source tile has been read for a final tile and in response marking related cache lines for at least one of eviction and invalidation.

7. The method of claim 1, wherein tile mapping comprises utilizing a binning unit to determine which tiles in a first RT are intersected by triangles in a second RT.

8. The method of claim 1, wherein determining an interleaving schedule comprises determining an implication of a dependency mapping on resource usage and an order of tile processing.

9. The method of claim 1, further comprising determining a truncation of a dependency mapping of the dependency relationship.

10. In a graphics processing system, a method comprising:
determining a dependence relationship between at least two render targets (RTs) of a graphics processing operation;
determining an interleaving schedule defining an order of tile processing of the graphics processing operation to maintain intermediate tile processing results of dependent render targets of the graphics processing operation in an on-chip cache; and
rendering tiles using the interleaving schedule;
wherein source tiles that are not required to produce the destination tile are not included in the interleaving schedule eliminating unneeded work.

11. In a graphics processing system, a method comprising:
determining a dependence relationship between at least two render targets (RTs) of a graphics processing operation;
determining an interleaving schedule defining an order of tile processing of the graphics processing operation to maintain intermediate tile processing results of dependent render targets of the graphics processing operation in an on-chip cache; and
rendering tiles using the interleaving schedule;
wherein a number of levels of the dependency mapping is limited to truncate the dependency mapping.

12. In a graphics processing system, a method comprising:
determining a dependence relationship between at least two render targets (RTs) of a graphics processing operation;
performing a tile mapping of destination tiles to source tiles based on the dependence relationship;
scheduling an interleaved order of tile processing for a sequence of render target steps having a dependency of render targets utilizing the tile mapping, the interleaved order selected to maintain a set of intermediate tile processing computations of dependent render targets in an on-chip cache of a graphics processing unit in the graphics processing system; and
rendering tiles using the interleaving order of tile processing,
wherein performing tile mapping comprises mapping a destination tile back to source tiles.

13. The method of claim 12, wherein the interleaved order is selected to have a maximum likelihood of maintaining intermediate tile processing computations in an on-chip cache.

14. In a graphics processing system, a method comprising:
scheduling an interleaved order of tile processing for a sequence of render target steps having a dependency of render targets, the interleaved order selected to maintain a set of intermediate tile processing computations of dependent render targets in an on-chip cache of the graphics processing system; and
rendering tiles using the interleaving order of tile processing;
wherein the tile-level dependency is determined by mapping a destination tile back to source tiles to determine a dependency mapping.

15. In a graphics processing system, a method comprising:
scheduling an interleaved order of tile processing for a sequence of render target steps having a dependency of render targets, the interleaved order selected to maintain a set of intermediate tile processing computations of dependent render targets in an on-chip cache of the graphics processing system; and
rendering tiles using the interleaving order of tile processing;
wherein the interleaved order is further selected based on the dependency to omit tiles not required by the dependency to generate a final result of the sequence of render target steps.

16. A graphics system, comprising:
a graphics processing unit having an on-chip cache;
a dependency analysis module to determine dependencies in a graphics processing operation including a set of interdependent render target operations; and a scheduling module to schedule an interleaved order of tile processing of the graphics processing operation, based on the dependency analysis, to maintain intermediate tile processing computations in the on-chip cache of the graphics processing unit,
the graphics system being configured to:
perform a tile mapping of destination tiles to source tiles based on the dependence relationship, wherein the tile mapping is utilized to determine the schedule of the interleaved order; and
render tiles using the schedule of the interleaved order, wherein performing tile mapping comprises mapping a destination tile back to source tiles.

17. The graphics system of claim 16, wherein the graphics processing unit comprises programmable graphics hardware and the programmable graphics hardware is programmed to assist in the dependency analysis.

18. The graphics system of claim 16, wherein a driver performs a target dependency analysis and the driver schedules the interleaved order of tile processing.

* * * * *